United States Patent
Hamel et al.

(10) Patent No.: US 11,257,144 B1
(45) Date of Patent: Feb. 22, 2022

(54) SYSTEM, METHOD AND NON-TRANSITORY COMPUTER-READABLE MEDIUM FOR SELECTING USER INTERFACE ELEMENT TYPES FOR DISPLAY WITH A SEARCH RESULT ACCORDING TO ITEM CATEGORY FEATURES OF PRIOR ITEM SELECTIONS

(71) Applicant: Amazon Technologies, Inc., Seattle, WA (US)

(72) Inventors: Andrew Dennis Hamel, Seattle, WA (US); Lisa Jane Hinegardner, Issaquah, WA (US); Vijai Mohan, Bellevue, WA (US); Srikanth Thirumalai, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 198 days.

(21) Appl. No.: 15/861,534

(22) Filed: Jan. 3, 2018

(51) Int. Cl.
*G06Q 30/00* (2012.01)
*G06Q 30/06* (2012.01)
*G06F 16/9535* (2019.01)

(52) U.S. Cl.
CPC ..... *G06Q 30/0643* (2013.01); *G06F 16/9535* (2019.01); *G06Q 30/0631* (2013.01); *G06Q 30/0633* (2013.01)

(58) Field of Classification Search
None
See application file for complete search history.

(56) References Cited

U.S. PATENT DOCUMENTS

| 8,190,601 B2 | 5/2012 | Ahari et al. |
| 8,688,726 B2 | 4/2014 | Mahajan et al. |

(Continued)

OTHER PUBLICATIONS

NextCard launches new online shopping comparison tool with holiday low price guarantee. (Nov. 1, 2000). Business Wire Retrieved from https://dialog.proquest.com/professional/docview/1071865990?accountid=161862 (Year: 2000).*

(Continued)

*Primary Examiner* — Allison G Wood
*Assistant Examiner* — Ashley D Preston
(74) *Attorney, Agent, or Firm* — Robert C. Kowert; Kowert, Hood, Munyon, Rankin & Goetzel, P.C.

(57) ABSTRACT

A network-based enterprise or other system that makes items available for selection to users may implement selecting user interface elements for inclusion with a search result according to item category features of prior item selections. A search request for an item may be received. An item category for the item may be identified and a user interface element type selection model for the item category may be accessed to select of user interface element types for inclusion in a display of a search result in response to the search request. The user interface element type selection model for the item category may be generated based on features of previous item selections in the identified item category. Content for the selected user interface elements may be determined and a display of the search result may be provided that includes user interface elements generated according to the selected type and identified content may be included.

20 Claims, 12 Drawing Sheets

(56) References Cited

U.S. PATENT DOCUMENTS

| | | | | |
|---|---|---|---|---|
| 8,688,732 B1* | 4/2014 | Rajyaguru | ......... | G06Q 30/0278 |
| | | | | 707/776 |
| 2011/0295720 A1* | 12/2011 | Parikh | ................ | G06Q 30/06 |
| | | | | 705/27.1 |
| 2016/0342288 A1* | 11/2016 | Konik | ............... | G06F 16/24578 |

OTHER PUBLICATIONS

NextCard launches new online shopping comparison tool with holiday low price guarantee. (Nov. 1, 2000). Business Wire Retrieved from https://dialog.proquest.com/professional/docview/673049228?accountid=131444 (Year: 2000).*

* cited by examiner

SYSTEM, METHOD AND NON-TRANSITORY COMPUTER-READABLE MEDIUM FOR SELECTING USER INTERFACE ELEMENT TYPES FOR DISPLAY WITH A SEARCH RESULT ACCORDING TO ITEM CATEGORY FEATURES OF PRIOR ITEM SELECTIONS

BACKGROUND

The advent of mobile computing has changed the context in which user interactions with different systems are performed. Displays of computing devices may no longer be limited to desktop or laptop computers but include various kinds of mobile phones, appliances, wearable technologies, among others. Search interactions often include requests for items that may result in large numbers of search results that can be difficult to adapt to the different types of items being searched along with the respective devices at which the search results may be displayed. Technologies that can adapt the search interaction experience to different display contexts may improve the performance of systems offering search capabilities.

Figure 1:
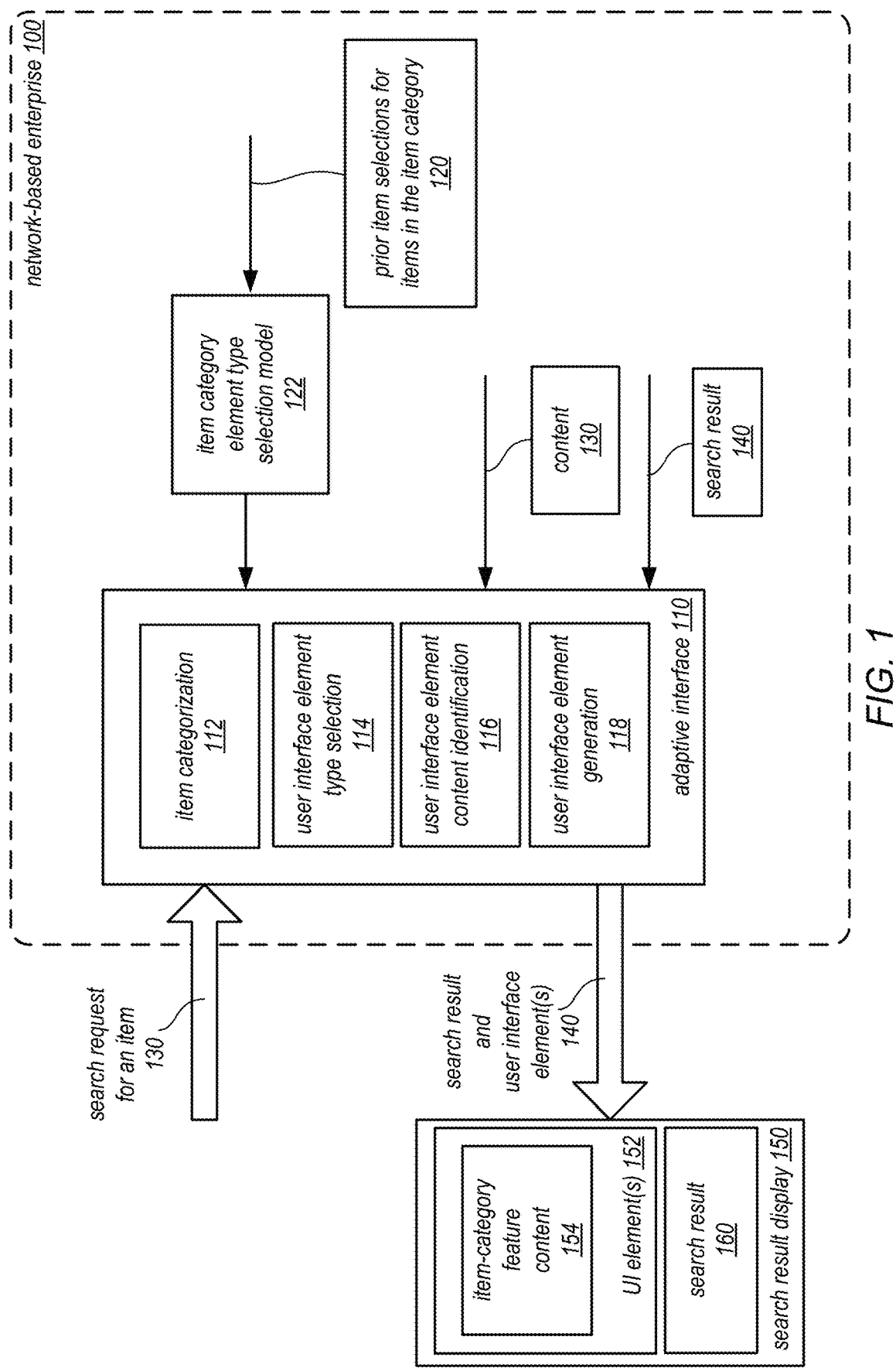
FIG. 1 is a logical block diagram illustrating selecting user interface element types for display with a search result according to item category features of prior item selections, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a computer system may be configured to perform operations even when the operations are not currently being performed). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f), interpretation for that component.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION

Various embodiments of selecting user interface element types for display with a search result according to item category features of prior item selections are described herein. Interfaces for network-based enterprises or other systems, services, or components that may offer large numbers of items (e.g., millions or billions of items) often facilitate search requests. A user may submit a search request for an item via an interface (e.g., a graphical user interface hosted by one or more servers) that allows a user to request a particular item or type of item. The search result returned via the interface may include a display of items that are found to be similar to or match the item described or identified in the search request. Because the number of items that satisfy a search request may be very large (e.g., tens of thousands or hundreds of thousands), a search request alone may not be able to provide sufficient information for a user to select an item that best satisfies a user's desires. For example, a user would likely be unable to evaluate or review all of the potential items that match or satisfy an item search request if the number of items returned in a search result were very large (e.g., a user would not have sufficient time to individually evaluate 10,000 possible items returned in a search result). Additionally, the differences or features of the items of the search result may not be easily discernable or distinguishable, making it difficult for a user to filter out or exclude some of the items returned in the search result.

Different types of user interface elements returned along with a search result may provide tools, features, recommendations, or other information to help a user interpret or navigate a search result, in some embodiments. For search results that return large numbers of items, user interface elements can help a user to distinguish which features of the items are more likely to satisfy a user's desires. In various embodiments, user interface element types may be dynamically selected for display with a search result according to item category features of prior item selections in order to user interface elements that adapt to the type of item being searched. For example, item features that are insightful for narrowing or filtering search results for one item search (e.g., quantity) may be unhelpful for another type of item search. Selecting user interface elements for display with a search result based on item category features of prior item selections may identify and provide user interface elements that are relevant for navigating or otherwise interpreting search results for different items by identifying which search results should include filters, recommendations, or other user interface element content (e.g., when quantity is relevant or not relevant to users in navigating a search result).

Moreover, display area utilized for displaying search results may be limited, in various scenarios. Selecting what types of user interface elements to display within the limitations of the display area may make it difficult to appropriately select user interface elements to include along with the display of search results. As the number and type of devices that can display search results grows (e.g., wearable display devices, appliances with displays, different sizes and shapes of mobile phones or other mobile computing devices, in additional laptop and desktop displays), dynamically or adaptively selecting user interface element types to include with search results according to item category features of prior item selections may prevent entities from having to manually generate different user interface element configurations according to the limitations of for the different types of displays or adapt result displays that are difficult for a user to navigate.

Additionally, dynamically or adaptively selecting user interface element types to include with search results according to item category features of prior item selections improves the capability of various types of computers and connected or associated display devices (e.g., from desktop, laptop or other traditional computing and display devices to the ever expanding numbers of alternative computing and display devices found in mobile or wearable technologies) to provide a tailored user interface and interaction for a user suited to the capabilities of the computing devices at which the search results may be displayed and thus improving the ability of these computers to display information and interact with the user. In this way, the features, techniques, and claims in this application solve problems of prior graphical user interfaces in the context of item selections (e.g., purchases) relating to speed, accuracy, usability, content suitability (e.g., parental controls), and eliminating any doubts an online customer may have about purchasing a product online. For example, product quantities of various items may be limited making the capability to quickly locate and evaluate items for purchase important to a user when item quantities may sell out. By selecting user interface elements dynamically (e.g., providing recommendations according to particular features, tools or content for quick evaluation, pictures, views, or other textual/graphical information about items that is found to be valuable based on prior selections of items within an item category), the graphical user interface may allow a user to succeed in making a purchase that might otherwise be unsuccessful (e.g., because the product could not be found or evaluated before it sells out).

FIG. 1 is a logical block diagram illustrating selecting user interface element types for display with a search result according to item category features of prior item selections, according to some embodiments. Adaptive interface 110 may dynamically select user interface element types and content to include with a search result 140 that is provided in response to a search request for an item 130, in some embodiments. Adaptive interface 110 may be implemented as part of a network-based enterprise 100, as discussed below with regard to FIGS. 2-3, or other systems, services or devices that provide a user interface to search for items that may be selected (e.g., for consumption, order, or other uses, such as navigating large collections of items, like museum collections or inventories). Adaptive interface 110 may be implemented across one or multiple computing systems, such as computing system 2000 discussed below with regard to FIG. 11.

Adaptive interface 110 may implement or utilize item categorization 112, in various embodiments, to identify an item category (or multiple item categories) out of the total set of item categories of items that can be selected at network-based enterprise 100 for search request for an item 130. Item categorization 112 may, for example, implement one or multiple types of text classifiers (e.g., support vector machines, Bayes classifiers, decision trees, or latent Dirichlet allocations (LDAs)) to analyze a text string received as input for the search request 130 and determine an item category for the item indicated in the search request. Item categorization 112 may, in some embodiments, be implemented as part of a search engine or other search analysis components performed as part of generating a search result and thus may be implemented outside of adaptive interface 110 (like item search engine 270 in FIGS. 2 and 3).

Adaptive interface 110 may implement or utilize user interface element type selection 114, in various embodiments, to select one or multiple user interface element types for a search request. For example, user interface element type selection may evaluate a model 122 or other structure generated according to the features of items in the identified item category of prior item selections of users 120. Item category element type selection model 122 may be generated according machine learning and/or other statistical techniques that allow user interface element type selection for items within the category to change over time as item category element type selection model 122 is trained or otherwise updated. Item category element type selection model 122 may, for instance, indicate that user interface elements to include with one search result for an item may include a user interface element that is explanatory for understanding search results (e.g., such as explanatory element type 730 in FIG. 7). After further training or other updates, item category element type selection model 122 may change so that when a search request for the same item is received, a different user interface element type (e.g., that provides an item recommendation based on a feature 710 in FIG. 7) may be included instead. User-specific selections may be used to modify or adapt results from evaluating item category element type selection model 122 for a user (e.g., using user-specific user interface element selection type models 286 as discussed in FIGS. 2, 3, and 5), in some embodiments.

Prior item selections 120 may identify which features (or other attributes) of an item category are determinative for the selection of items within the item category, such as physical characteristic of an item (e.g., size, color, shape, etc.), performance or capability of items within the item category (e.g., speed, features, etc.), usage or delivery characteristics of items within the item category (e.g., estimated delivery time, compatible platforms or devices for consumption, distance from a user, etc.), or other features that may filter, recommend, refine, or explain items included in search result. User interface type selection 114 may select one or multiple types of user interface elements to include in a search result dynamically, based on the features of items previously selected for users. For example, an item may be frequently selected if detailed reviews, photos, or other explanatory information for the item is included in the description of the item, which may lead user interface element type selection 114 to select a search explanation type of user interface element (e.g., item category overviews, comparisons, reviews, or other information) to help users distinguish between the various features of items that may be returned and discover which features best fit or satisfy user desires. Other user interface element types, such as item feature recommendation types which may recommend an item in the search result based on a particular feature (e.g., physical, usage, capability, etc.) or search refinement user interface element types, which may identify and obtain further information (e.g., features) in order to filter or refine the result of a search request, may be similarly selected in various embodiments, as discussed below with regard to FIGS. 4, 5, and 7.

Different versions of the same user interface element type may be selected or included (e.g., multiple item feature recommendation types for different item features). Similarly, different types of user interface elements may be selected for inclusion with the same search result (e.g., search explanation and search refinement together). As the search request for an item may be associated with a particular user, the user interface element types selection 114 may be performed weighting, emphasizing, or solely according to the features of items within the item category previously selected by a user, in some embodiments. For example, if user A frequently selects items within an item category that are available within a certain delivery timeframe (e.g., within 24 hours) or delivery method (e.g., drive through pickup), then an item feature recommendation type may be selected that recommends an item that satisfies this delivery timeframe or method. In this way, user interface elements included with a search result may adapt to a specific user in addition to (or instead of) adaptations based solely on the item being searched for (e.g., item category specific adaptations), in some embodiments. In some embodiments, user selections of other items within other item categories may be used to forecast or model likely features to be displayed to a user in an different item category. Therefore, prior selections for a specific user may not be limited to considering only those selections that occurred within the identified item category, in some embodiments.

User interface type selection 114 may, in some embodiments, be responsive to the context of a search request. For example, if a search request is for an item that is usable in different contexts, where the different contexts may emphasize or prioritize different item features, then the search context may be discovered or determined to emphasize which features should be used for user interface element type selection (e.g., select a search refinement type in order to obtain the additional features for a context or identify which features may be selected for an item feature recommendation user interface element). Search context may include the location of a user when the search request is submitted, a location or context for using, obtaining, or consuming the item, or various other information specific to a particular search request (e.g., as opposed to all search requests for a same item). Similarly, device context may influence or help determine the selection of user interface element types 114, in some embodiments. Mobile devices, or devices with limited display area, may be detected and influence the number, display features, or type of user interface element selection. For example, a search explanation type user interface element may be included with a search result along with item feature recommendation user interface elements if a display device has a large display area for the search result, whereas the display area for the search result for the same search request with a device with a small display area may influence user interface element type selection 114 to eliminate or exclude an item feature recommendation user interface element or the search explanation interface element.

Adaptive interface 110 may implement or utilize user interface element content identification 116 in order to obtain the content 130 for identified user interface element types. For example, item recommendation models, item reviews, descriptive information, or other item data, external content sources, such as user guides or forums, review sites, or media platforms (e.g., video sharing sites), content generation or selection, including textual or image-based prompts, may be implemented to obtain the content to include in a user interface element type. Adaptive user interface element generation 118 may generate, locate, construct, obtain, or otherwise assemble the code, executables, instructions or other information to cause an obtained search result 140 of the search request to be included 160 in a search result display 150 along with the selected user interface element types 152 and the respective content 154 obtained for the different user interface element types. For example user interface element generation 118 may assemble the appropriate scripts, references, links, or other information to be provided to a device that displays the search result (e.g., providing html, JavaScript, or other information to a browser application).

Please note, FIG. 1 is provided as a logical illustration of selecting user interface element types for display with a search result according to item category features of prior item selections, and is not intended to be limiting as to the physical arrangement, size, or number of components, modules, or devices, implementing an adaptive interface, item selection data, user interface element types or content, search result displays, or search requests.

This specification begins with a general description of a network-based enterprise that may implement selecting user interface element types for display with a search result according to item category features of prior item selections. Then various examples of the network-based enterprise including different components/modules, or arrangements of components/module that may be employed as part of implementing selecting user interface element types for display with a search result according to item category features of prior item selections are discussed. A number of different methods and techniques to implement selecting user interface element types for display with a search result according to item category features of prior item selections are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
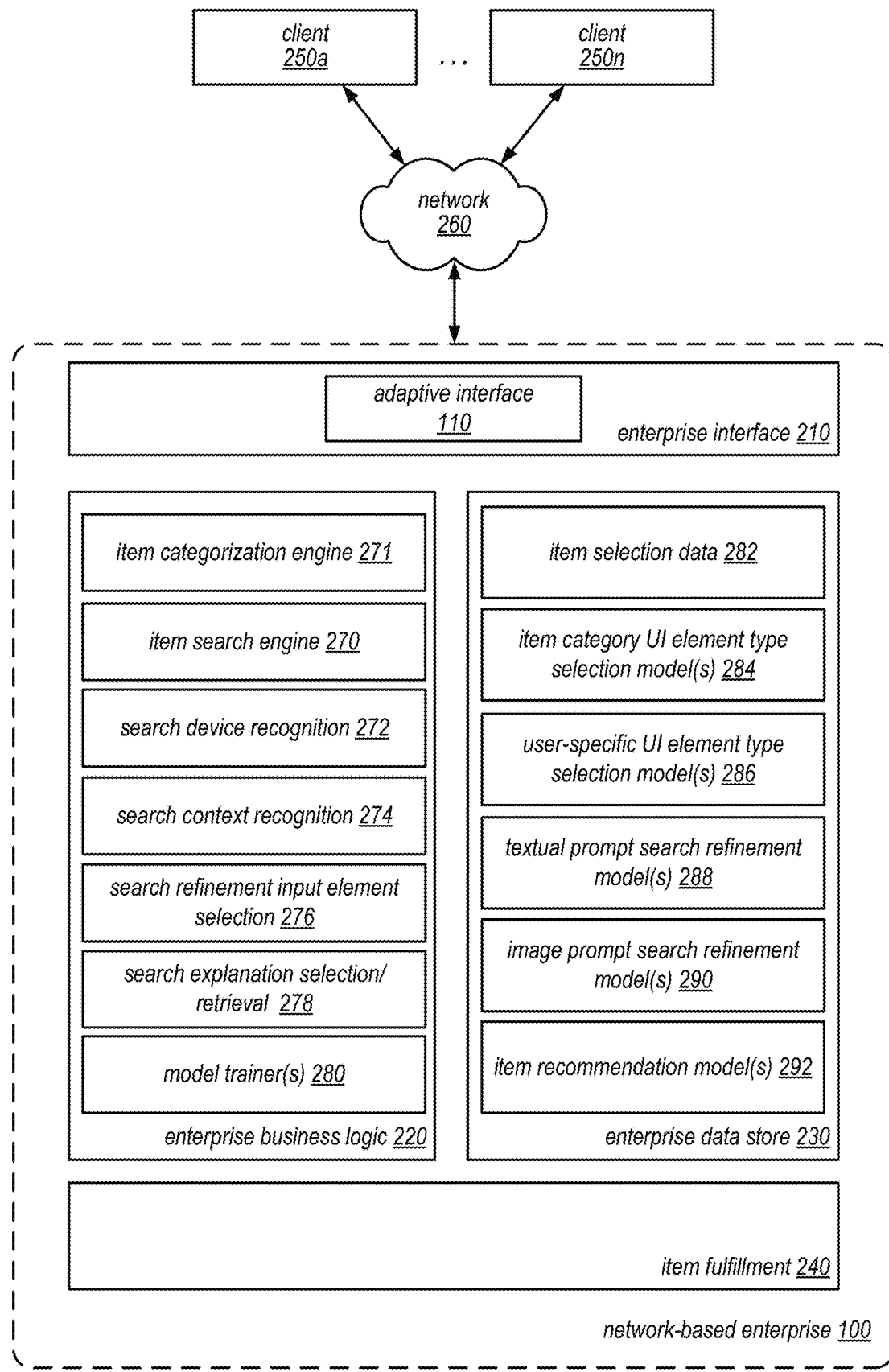
FIG. 2 is a logical block diagram illustrating a network-based enterprise implementing illustrating selecting user interface element types for display with a search result according to item category features of prior item selections, according to some embodiments.

The systems described herein may, in some embodiments, implement a network-based enterprise that offers items to users (which may be customers). The items may be used, purchased, rented, or otherwise consumed. Selection of an item may correspond to one of these actions and/or rating or reviewing a particular item. Some embodiments of a network-based enterprise system are illustrated in FIG. 2. In the illustrated embodiment, a number of clients (shown as clients 250*a*-250*n*) may be configured to interact with a network-based enterprise 200 via a network 260. An enterprise interface (e.g., a network-based site, such as a website) 210 may handle or communicate with clients 250. Enterprise business logic 220 may be configured to handle processing, management, and other techniques necessary to provide the request items to clients 250. Enterprise data store 230 may maintain information for the network-based enterprise 200. Item fulfillment 240 may be either the physical items, services, or digital resources provided to clients 250 upon selection. It is noted that where one or more instances of a given component may exist, reference to that component herein may be made in either the singular or the plural. However, usage of either form is not intended to preclude the other.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 11 and described below. In various embodiments, the functionality of a given system component (e.g., adaptive interface 110) may be implemented by a particular node or may be distributed across several nodes. In some embodiments, a given node may implement the functionality of more than one system component (e.g., more than enterprise business logic 220 component).

Generally speaking, clients 250 may encompass any type of client or other component configurable to submit network-based requests to network-based enterprise 200 via network 260, including requests to select particular items offered. For example, a given client 250 may include a suitable version of a web browser, or may include a plug-in module or other type of code module configured to execute as an extension to or within an execution environment provided by a web browser. For example, selection of physical products for purchase, submitting payment information and shipping information may be conveyed via the web browser. Alternatively, a client 250 (e.g., a gaming client) may encompass an application such as a gaming application (or user interface thereof), a media application, an office application or any other application that may make use of persistent storage resources to store and/or access digital items. In some embodiments, such an application may include sufficient protocol support (e.g., for a suitable version of Hypertext Transfer Protocol (HTTP)) for generating and processing network-based requests without necessarily implementing full browser support for all types of network-based data. That is, client 250 may be an application configured to interact directly with network-based enterprise 200 (or enterprise interface 210). In some embodiments, client 250 may be configured to generate network-based requests according to a Representational State Transfer (REST)-style network-based architecture, a document- or message-based network-based architecture, or another suitable network-based architecture.

Clients 250 may convey network-based requests (e.g., item selection requests) to and receive responses from network-based enterprise 200 via network 260. In various embodiments, network 260 may encompass any suitable combination of networking hardware and protocols necessary to establish network-based-based communications between client 250 and network-based enterprise 200 (and/or enterprise interface 210). For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 250 and network-based enterprise 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and network-based enterprise 200. It is noted that in some embodiments, client 250 may communicate with network-based enterprise 200 using a private network rather than the public Internet. For example, client 250 may via a private network as part of selecting and receiving digital items offered by network-based enterprise 200. In such a case, clients 250 may communicate with enterprise 200 entirely through a private network 260 (e.g., a LAN or WAN that may use Internet-based communication protocols but which is not publicly accessible).

Generally speaking, network-based enterprise 200 may be configured to implement enterprise interface 210 which may be configured to receive and process network-based requests, such as requests to select, browse, access, search, or otherwise interact with items offered. For example, enterprise interface 210 may include hardware and/or software configured to implement a network-based site, such that a web browser or other component implemented on client 250 may be configured to receive information via the network-based site. For example, in some embodiments, search requests for items offered by network-based enterprise 200 may be received via enterprise interface 210 and search results may be provided or returned via enterprise interface 210.

Enterprise interface 210 may be implemented as a server system configured to receive network-based requests from clients 250 and to forward them to components of a system, such as enterprise business logic 220, that facilitate the offering, sale, distribution or other functionalities of the items offered by network-based enterprise 200. In other embodiments, enterprise interface 210 may be configured as a number of distinct systems (e.g., in a cluster topology) implementing load balancing and other request management features configured to dynamically manage large-scale network-based request processing loads. In various embodiments, enterprise interface 210 may be configured to support REST-style or document-based (e.g., SOAP-based) types of network-based requests. As discussed in detail below with regard to FIG. 3, enterprise interface 210 may implement adaptive interface 110 in order to select user interface element types for inclusion with a search result based on features of item categories of prior item selections, in some embodiments.

Enterprise business logic 220 may be configured to facilitate the operations of network-based enterprise 200. For example, enterprise business logic 220 may coordinate the purchase, rental, access, sharing, metering and/or accounting of client usage/selection of items, which may be services, physical products, or digital media, in various embodiments. Enterprise business logic 220 may implement financial accounting and billing systems, or may maintain a database of usage data that may be queried and processed by external systems for reporting and billing of client activity. In certain embodiments, enterprise business logic 220 may be configured to collect, monitor and/or aggregate a variety of operational metrics, such as metrics reflecting the rates and types of requests received from clients 250, bandwidth utilized by such requests, system processing latency for such requests, system component utilization (e.g., network bandwidth and/or storage utilization within the storage service system), rates and types of errors resulting from requests or any other suitable metrics. In some embodiments such metrics may be used by system administrators to tune and maintain system components, while in other embodiments such metrics (or relevant portions of such metrics) may be exposed to clients 250 to enable such users to monitor their usage of services/items. Enterprise business logic may also implement various user and/or customer account functions which may be responsible for updating or maintaining customer/user account information. User information, such as a unique user identifier, may be linked to item selection data 282 for customers/users maintained in enterprise data store 230.

In some embodiments, enterprise business logic 220 may also implement user authentication and access control procedures. For example, for a given network-based request to access a particular item, enterprise business logic 220 may be configured to ascertain whether the client 250 associated with the request is authorized to access the particular item. Enterprise business logic 220 may determine such authorization by, for example, evaluating an identity, password or other credential against credentials associated with the particular item, or evaluating the requested access to the particular item against an access control list for the particular item. Various access control policies may be stored as records or lists of access control information by enterprise business logic 220. In some embodiments, these access control policies may be implemented to accept or deny access to multiple items offered by network-based enterprise 200 (e.g., some or all of streaming videos).

Figure 3:
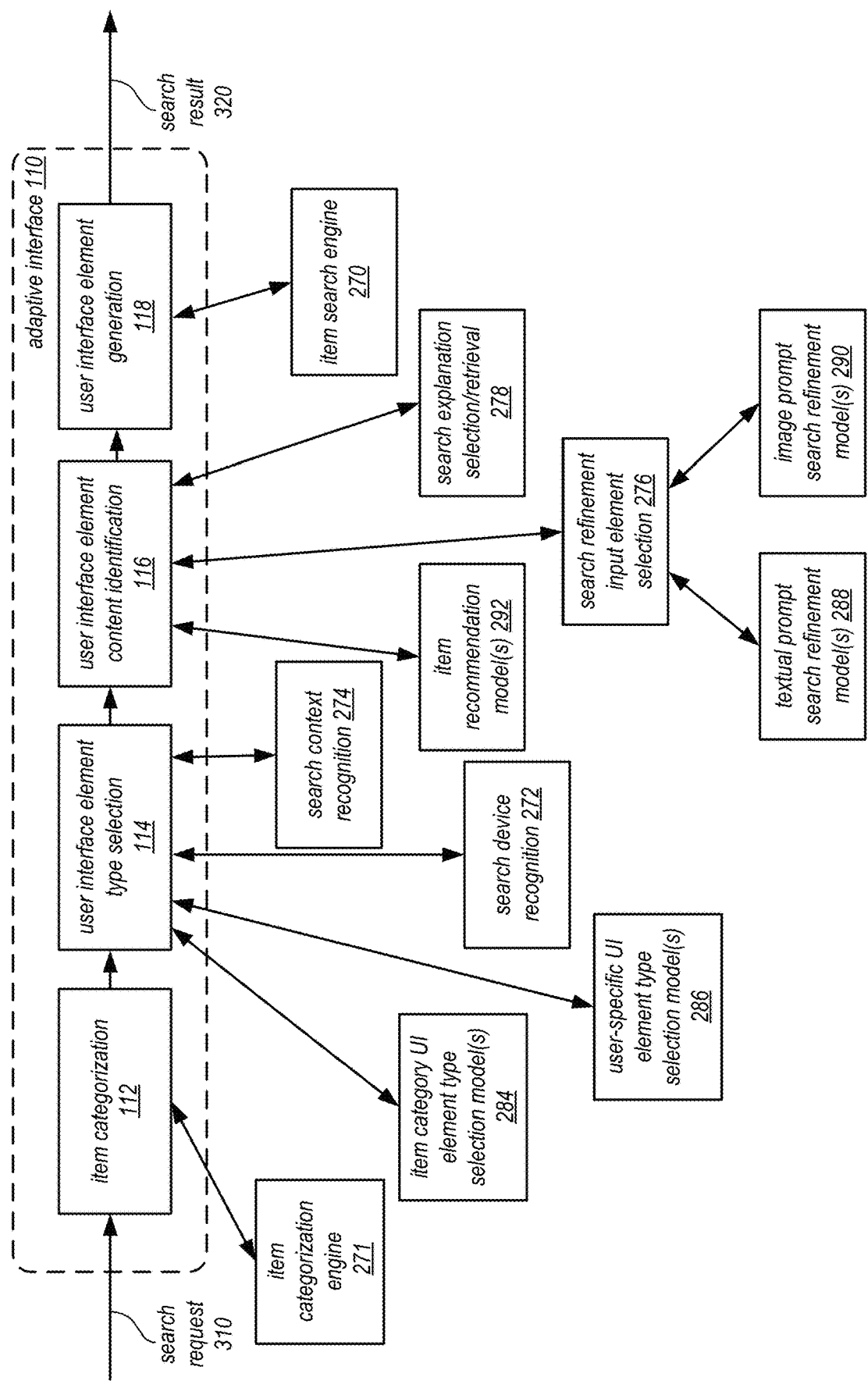
FIG. 3 is logical block diagram illustrating interactions between an adaptive interface and other network-based enterprise components to select user interface element types for display with a search result according to item category features of prior item selections, according to some embodiments.

As discussed in detail below with regard to FIG. 3, enterprise business logic 220 may implement various features or components to perform selection of user interface element types, as part of returning search results. Enterprise business logic 220 may include item categorization engine 271, item search engine 270, search device recognition 272, search context recognition 274, search refinement input element selection 276, search explanation selection and retrieval 278 and model trainer(s) 280, in some embodiments.

Enterprise data store 230 may be one or more storage nodes, systems, or servers configured to persistently store data for network-based enterprise 200, such as the aforementioned user information, item inventories, descriptive information, reviews, or other item information, item selection data 282, and various models or other collections of data that may be used to select user interface element types, including, but not limited to item category UI element type selection model(s) 284, user-specific UI element type selection model(s) 286, textual prompt search refinement model(s) 288, image prompt search refinement model(s) 290, and/or item recommendation model(s) 292. Various durability and/or security techniques may be implemented to ensure safe and reliable storage of sensitive information, such as payment information, accounts, or passwords.

Item fulfillment 240 may be one or more systems or devices configured to provide selected items to clients 250 that are offered by network-based enterprise 200. For example, item fulfillment 240 may be a network of one or more fulfillment centers that stock physical products and process shipment orders of those products selected by clients 250. In some embodiments, item fulfillment 249 may be application servers, content distribution networks, application, gaming or other media platforms that provide access to or a copy of digital media selected by clients 250. For example, movies, television shows, or other audio/visual media may be streamed or downloaded to clients 250 for consumption as part of a network-based video streaming or gaming service. If access to or rights to an item is limited, item fulfillment 240 may be configured to enforce digital rights management (DRM) or other controls to enforce the policies of the items and their respective offers (e.g., rental or borrow of digital media for certain time periods).

As illustrated in FIG. 2, network-based enterprise 200 may implement an adaptive interface 110 to select user interface element types to include with search results according to prior item selections. FIG. 3 is logical block diagram illustrating interactions between an adaptive interface and other network-based enterprise components to select user interface element types for display with a search result according to item category features of prior item selections, according to some embodiments. A search request 310 may be received at adaptive interface 110. Search request 310 may include a text stream or other item descriptive information that identifies an item, category of items, attributes or features of an item for which a search result of offered items at network-based enterprise 200 is desired.

Item categorization 112 may interact with item categorization engine 271 in order to identify or determine an item category for the search request. In some embodiments, item categorization engine 271 may be implemented as part of item search engine 270. In such scenarios, the identification of the item category for search request 310 may be obtained from the search engine and provided to other adaptive interface components while item search engine 270 continues to perform a search and generate search results.

User interface element type selection 114 may interact with various models, engines, or other components in order to identify respective numbers, types, display characteristics, and other information for user interface elements to include with a search result. For example, item category user interface element type selection model 284 may be trained by one or more model trainers 280 according to one or multiple types of machine learning techniques. Deep learning techniques, for instance, may be implemented (e.g., using a deep neural network) to model the relationship between features of selected items within the item category (e.g., physical attributes, capabilities, usage contexts, device contexts, previously included user interface element types, presence and/or quality of user-submitted reviews or product descriptions, etc.), user interface element types, and selection of items by users. Model trainer 280 may then apply the previous item selections of users including the user interface element types and item category features to train the deep neural network to map a search request for an item of the identified category to one of a specified set of user interface element type selections for that item category (e.g., user interface element item feature recommendation type for feature A, user interface element item feature recommendation type for item B, search explanation recommendation type, etc.). Please note that the previous example of machine learning, deep learning techniques such as deep neural networks, is not intended to be limiting as other types of machine learning, whether supervised or unsupervised could be implemented to determine user interface element type selections.

User interface element type selection 114 may interact with user-specific UI element type selection model 286, in some embodiments. A user for the search request may be identified, in various embodiments, (e.g., according to access credentials provided in a sign-on interface, a token, cookie, or other data structure provided to the network-based enterprise that can be verified to indicate the identity and/or authorization of a user to view or select items). User-specific UI element type selection model 286 may maintain UI element type selection modeling for specific users. For example, classification learning techniques or feature recognition techniques may generate a model for a user that classifies an item in the search request to map to common item category features (e.g., desired shipping times, delivery or pick up locations, physical characteristics, such as organic or natural items, etc.). In some embodiments, user-specific UI element selection modeling may be used to refine or modify the number or type of user interface elements selected by item category UI element type selection model 284 (e.g., by replacing a user interface element below a specified confidence threshold).

User interface element type selection 114 may interact with search device recognition 272, in some embodiments. For example, search device recognition may identify a display device (e.g., mobile device type, laptop display, desktop display, touch interactive display, etc.) to determine display feature parameters or limitations for user interface element types. Search device context may, for instance, limit the size or amount of content that can be included in an item feature recommendation user interface element, in some embodiments (e.g., reducing conveyed information to price, user rating, and manufacturer, instead of detailed descriptive information). In some embodiments, display limitations or other information for a search device may be used to train item category UI element type selection model(s) 284 in order to prioritize the selection of certain user interface element types for an item category that are successfully display within the limitations of a greater number of search devices User interface element type selection 114 may interact with search context recognition 274, in some embodiments. Search context recognition 274 may determine a search context for a search request. If, for instance, a search is for an item that is a service rendered (e.g., a meal, a spa service, a vehicle service, etc.), then search context may be a location of the user (e.g., by receiving location information from a mobile device of a user that submitted the search), in some embodiments. Search context may, in some embodiments, be a context for a use or consumption of the item. For example, if an item is a product used in particular locations (e.g., hiking backpack), then a location of use (which may be derived from a device location, account settings, or other search results shipping destinations, etc.) may be determined, which may inform or shape the selection user interface elements. Consider the hiking backpack example. If the search context indicates a location of the hike that the backpack may be used, then the item feature recommendation type, search explanation type, or search refinement type may be selected based on the location the hiking backpack is being used, such as a location that indicates that an internal frame backpack may be used (e.g., item feature recommendations that provide the recommendations for internal frame backpacks for bouldering, search explanations that describe different internal backpack features, search refinement features that prompt text input to describe the length of the hike, such as less than a day, 2-3 days, 3-5 days, etc.).

User interface element context identification 116 may identify and/or obtain the content for user interface element types selected by user interface element type selection 114. For example, for item feature recommendation element types, user interface element content identification 116 may evaluate or submit a request to evaluate an item recommendation model 292 with respect to an item category feature identified by user interface element type selection 114 (e.g., softest item, warmest item, etc.). Item recommendation model 292 may be generated from item selections, reviews, or other item data in order to recommend items. For example, collaborative-based recommendation models, content-based recommendation models, or a combination of collaborative and content-based techniques may generate an item recommendation model 292 for performing item recommendations. If, for instance, user prediction or comparison techniques are used to perform an item recommendation, then a user profile may be generated that highly weights or values the item feature identified for the item feature recommendation type and used in the comparison or analysis of the item recommendation model 292 to generate the item recommendation to be the content of the item feature recommendation type.

User interface element content identification 116 may identify or obtain content for search refinement user interface element types from search refinement input selection 276, in some embodiments. For example, search refinement input selection 276 may receive one or more item features (or other information or features indicated for search refinement from user interface element type selection 114) and determine whether text prompts or image based prompts may better elicit the desired information from a user (e.g., based on the desired information type, if phrases or other characteristics that may be elicited by a tailored question (e.g., "when will you use item X") or if the desired information is visual in nature (e.g., patterned, color range specific, large/small, etc.). Different models may be used to determine prompts. For example, textual prompt search refinement model 288 may be implemented to apply predicative text selection or other text generation techniques to generate a question or other text prompt that may be displayed for a user to answer (as discussed below with regard to FIG. 9A). Similarly, image prompt search refinement model 290 may be implemented to select representative images with different visual characteristics which may be used to specify styles, colors, or other visual features (e.g., for refining a search for clothes or accessories), as discussed below with regard to FIG. 9B.

User interface element content identification 116 may identify or obtain content for search explanation types of user interface elements, in some embodiments, from search explanation selection and retrieval 278. For example, search explanation selection and retrieval may receive an indicated search explanation (e.g., video review, text review or guide, FAQ, etc.) that identifies or discusses various item attributes, differences, features, or other item information that may allow a user to make an better informed selection from amongst items offered in a search result. Search explanation selection and retrieval 278 may access or determine item reviews or other item descriptive information to generate a list of common features or attributes to consider, identify external sources (e.g., external with respect to network-based enterprise 200) that provide a review of items or item categories (e.g., searching, crawling, or scraping consumer review sites, forums, magazines, and other sources for network-hosted information) or to provide direct links to the located content as the content of a user interface element.

User interface element generation 118 may receive the selected user interface element types and content from user interface element type selection 114 and user interface element content identification 116 respectively to generate the user interface elements of the identified types with the identified content for inclusion in a search result 320 that includes item results from item search engine 270. Item search engine 270 may, for example, implement various natural language processing and indexing techniques to identify items offered by network-based enterprise 200 which may be returned in response to a search request 310. User interface element generation 118 may assemble, construct, compile, generate, or otherwise provide the data to a device for display of search result 320 to include both the search results and the selected user interface element types and content.

Figure 4:
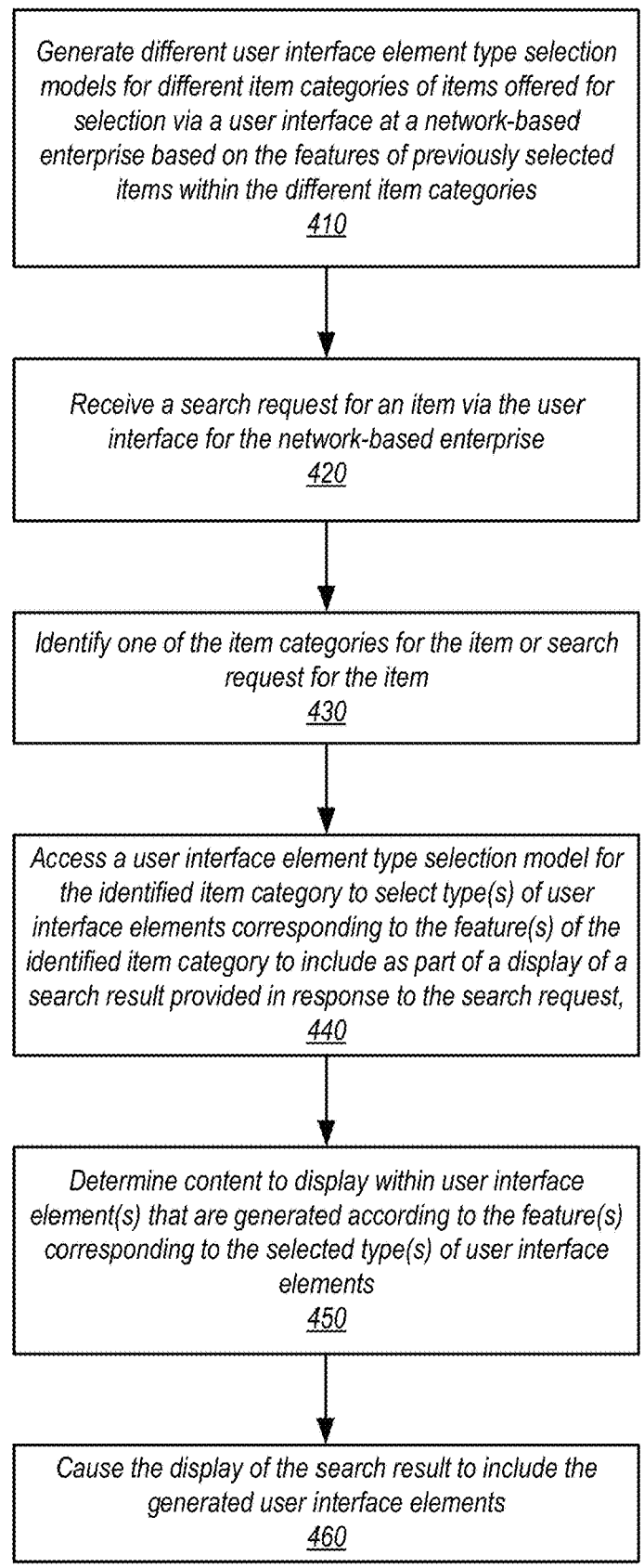
FIG. 4 is a high-level flowchart illustrating methods and techniques for implementing user interface element types for display with a search result according to item category features of prior item selections, according to some embodiments.

The various embodiments of a network-based enterprise implementing selecting user interface element types for display with a search result according to item category features of prior item selections described with regard to FIGS. 2-3 above, may implement one or more different techniques or interfaces described below with regard to FIGS. 4-10. However, various other kinds of systems, services, components or devices may implement selecting user interface element types for display with a search result according to item category features of prior item selections. FIG. 4 is a high-level flowchart illustrating methods and techniques for implementing user interface element types for display with a search result according to item category features of prior item selections, according to some embodiments. Different combinations of systems and/or devices may implement the various techniques discussed below.

As indicated at 410, different interface element type selection models may be generated for different item categories of items offered via an interface at a network-based enterprise based on the features of previously selected items within the different item categories, in some embodiments. Features of an item category, such as the features of an item within the category (e.g., physical or usage), the manufacturer, producer, or provider of items, the delivery timeframes or modes of items, recommendation or approval labels, guides, biographies, question and answer data, refinements or sub categories within the item category, or related items, among other features of an item category, may be considered when generating the interface element type selection model, in various embodiments. For example, feature selection techniques may be applied to a history of item selections within a category to identify or determine a number, type, and or size of user interface elements corresponding to different features of an item category. If, for instance, two features have indicators of item selection within a category, then the two features may be indicated in the model for inclusion within prominent display characteristics.

The generated models may be maintained as decision trees, nearest neighbor or other classification data sets, UI layouts or templates, ranked lists of user interface element types, or other data structures. Some generated models may necessitate further evaluation (e.g., a nearest-neighbor store of UI element vectors linked to UI layouts or templates by identifying a nearest neighbor to a vector generated for the search request or an evaluation of which user interface elements according to a decision tree model for the item category), in some embodiments. Models may, in some embodiments, need no further evaluation other than including the indicated user interface element types.

As indicated at 420, a search request may be received for an item. The item may be identified according a text string or phrase describing the item. A user associated with the search request may be identified according to a user identifier included as part of the search request, in some embodiments. The search request may be received via the user interface (e.g., a text input interface in graphical user interface of a network-based site or may be a request formatted according to a programmatic interface (API) for performing an item search).

As indicated at 430, one of the item categories may be identified for the item of the search request or the search request for the item, in various embodiments. Different textual classification techniques (e.g., support vector machines, Bayes classifiers, decision trees, or latent Dirichlet allocations (LDAs)) may be applied to the search request input string to map the string to one of the item categories offered by the network-based enterprise. For example, the search request for the item may include a word or phrase that explicitly identifies an item, such as a search request for a "watch." In some embodiments, the search request may not explicitly include the item, but may refer to a category, activity, location, or other information that may be used to select an item category ("camping," "hiking" or "Hawaii").

As indicated at 440, a user interface element type selection model for the identified item category may be accessed to select one or more types of user interface elements corresponding to one or more features of the identified item category to include as part of a display of a search result provided in response to the search request, in various embodiments. For example, as discussed above user interface element type selection models may be used to evaluate the search request according to the type of model (e.g., nearest neighbor comparisons by generating a vector that represents the search request, following different paths along a decision tree according to information provided by the search request (and other information such as device context, search context, user context, and so on). Some user interface element type selection models may be used to rank or prioritize the display user interface element types for item category features so that display limitations for the search result may be used to identify those user interface element types and corresponding features that can satisfy the display limitations, in some embodiments. As discussed below at FIG. 5, selected user interface element types may include a number for each user interface element type and/or display configurations of the selected user interface element types (e.g., location, size, etc.).

As indicated at 450, respective content to display within respective user interface elements that are generated according to the feature(s) corresponding to the determined types of user interface elements may be determined, in various some embodiments. Content for different user interface elements may be determined dependent on the user interface element type. If, for instance, an item feature recommendation type is selected, then the content of the item feature recommendation type may be retrieved by obtaining an item recommendation that weights the rating, evaluation, or other scale for recommending the item according to the identified item feature. Similarly, content for other user interface element types may be obtained dependent on the identified user interface element type. Content may be obtained from mining item data (e.g., user reviews of items, item descriptive information, external item descriptions, database, or reviews, and so on) to retrieve further information to describe the item, item features, determine further information that could refine search results for the item search request, or obtain information that can contextualize item features that may be identified for items in a search result.

As indicated at 460, the display of the search result may be caused to include the generated user interface elements, in some embodiments. For example, templates for user interface elements may be accessed and modified in order to include the identified content, display attributes, and other information determined for the display of the search result. The output of a search result may be wrapped, modified, or combined to include the generated user interface elements. In some embodiments, the display of search results may be modified to accommodate the user interface elements that are to be included (e.g., reducing the number of search results displayed at one time). In some embodiments, multiple versions of the generated user interface elements may be included in order to adapt the display of the user interface elements as interactions with the display of the search results are performed (e.g., as a display device orientation changes from vertical to horizontal positioning the arrangement, display, or number of user interface element types may change).

Figure 5:
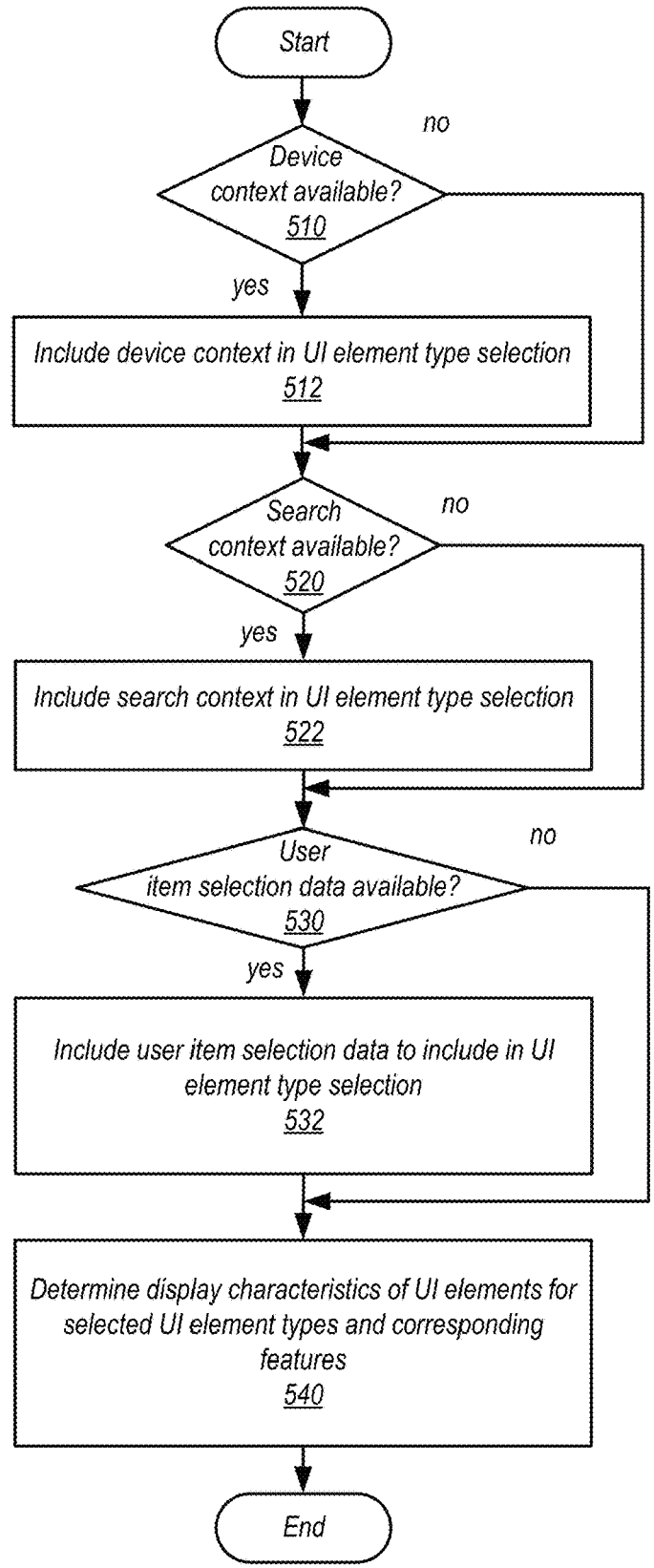
FIG. 5 is a high-level flowchart illustrating methods and techniques for evaluating item category features of prior selections of items to determine user interface element types, according to some embodiments.

Selection of user interface element types may be implemented in various ways. FIG. 5 is a high-level flowchart illustrating methods and techniques for evaluating prior selections of items to determine user interface element types, according to some embodiments. Different sources of information may inform the selection of user interface elements as well as how the user interface elements are displayed. For example, as indicted at 510, a determination may be made as to whether device context information is available to consider or evaluate for perform the user interface element type selection, in some embodiments. A device identifier, configuration profile, display settings, or other information may be included in a search request or identifiable based on a connection between an interface and a device that displays the search result (e.g., device information may be exchanged as part of establishing a connection so that the appropriate version of a user interface is provided to the device, such as a mobile interface, desktop or full version interface, etc.). If device context is available, then the device context may be included in the user interface element selection (e.g., determining a number of and/or display features for selected user interface element types), as indicated at in 512.

A similar evaluation may be made with respect to search context, as indicated at 520. Search context may be discovered or included with a search request (e.g., via location information for the user that is shared with the search request). In some embodiments, search context may be determined from a user profile. For example, if a search request for a user identifies a search for an item that is offered in different sizes, a user profile may indicate a default size for the user for that item. As indicated at 522, search context may be included in the UI element type selection, in some embodiments.

In at least some embodiments, sufficient user item selection data may be available for analysis to be user part of the analysis of an item category user interface element type selection model, modify the selection of user interface element types determined from an item category user interface element type selection model, or as may be used to generate a user-specified user interface element type selection model (as discussed above in FIGS. 2-3). For example, user accounts may be flagged or marked when a number of prior item selections exceeds a size or other threshold in order to provide a large enough sample size to select user interface elements above a minimum confidence threshold. As indicated by the positive exit from 530, user item selections may be include in determining the type(s) of user interface elements selected (as discussed above at element 440 in FIG. 4), as indicated at 532. For example, user item selection analysis may include the determination of confidence values for each user interface element type that may be identified by evaluating the user interface element selectin type model for an item category. If a user interface element type has a confidence value that exceeds a threshold, then that user interface element type for a corresponding feature may be selected, in some embodiments. Alternatively (not illustrated), for those modifications with confidence values that do not exceed a confidence threshold, modification may not be applied.

As indicated at 540, display characteristics of UI elements for selected UI element types and corresponding features may be determined based on the included information (e.g., device context, search context, and/or user context), in various embodiments. Display characteristics or attributes may include an ordering or location within a display of user interface element types within a display, size of element, amount of content to include, etc.).

Figure 6A:
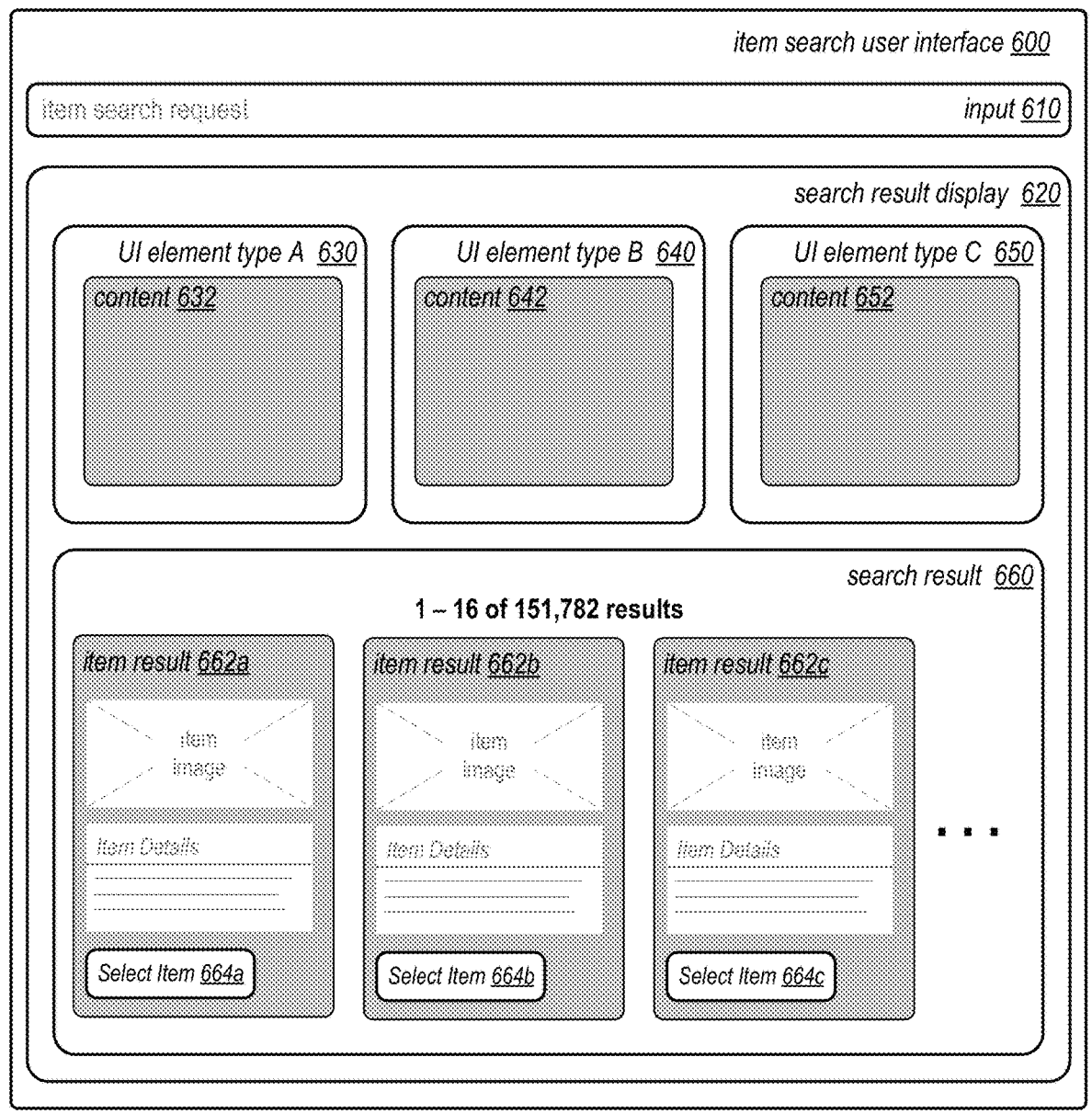
FIGS. 6A and 6B are graphical user interface examples that include selected user interface elements types for display with a search result, according to some embodiments.

FIG. 6A illustrates an example graphical user interface that includes selected user interface elements types for display with a search result, according to some embodiments. Item search user interface 600 may include a text input element 610, which may allow a user to input a search request. Search result display 620 may provide a display area for the results of the search. As illustrated in display 620, different user interface element types A 630, B 640, and C 650 may be selected and included along with respect content for the user interface element types, 632, 642, and 652. Search result 660 may include multiple results, such as item results 662*b*, 662*c*, and 662*c*, along with select user interface elements 664*a*, 664*b*, and 664*c*.

Figure 6B:
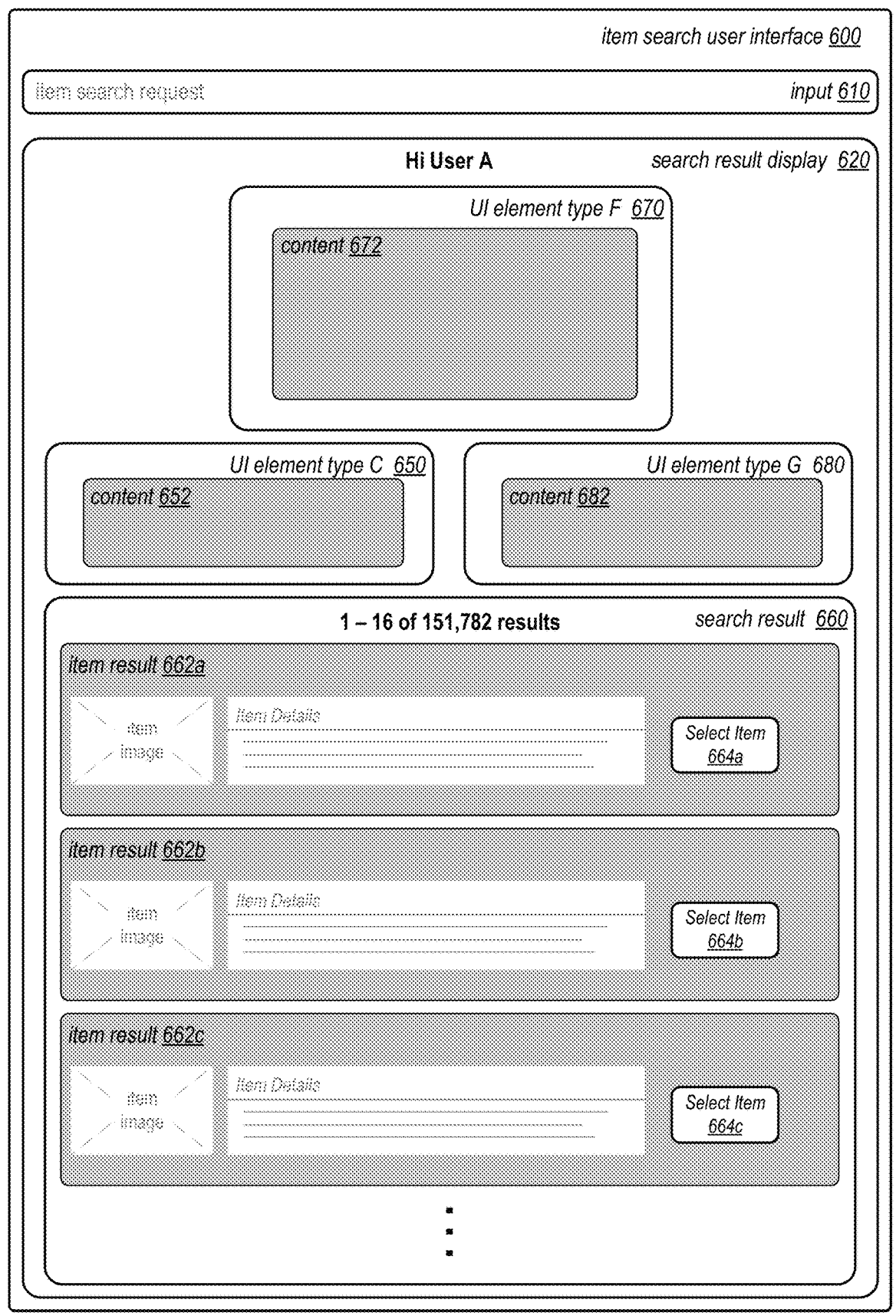

FIG. 6B illustrates an example graphical user interface that includes selected user interface elements types for display with a search result based on user-specific item selections, according to some embodiments. Search result display 620 may provide a display area for the results of the search. However, although the same item search result may have been provided, user interface element types specific to user A may be included (which are different than those in FIG. 6A). For example, the location and other display attributes (e.g., size) of user interface elements may be different for user A. Different user interface element types may be selected, such as UI element type F 670, with content 672, and UI element type G 680, with content 682. Differences may also extend to the display of search results 660. For example, the location and other display attributes of item results 662 may differ (even though returned items may be the same). Both the selected user interface elements provided in FIGS. 6A and 6B may be adapted according to learnings obtained by analyzing the prior selections of items by users. However, FIG. 6B may illustrate the possible user specific adaptions that may be learned and selected for a search result.

Figure 7:
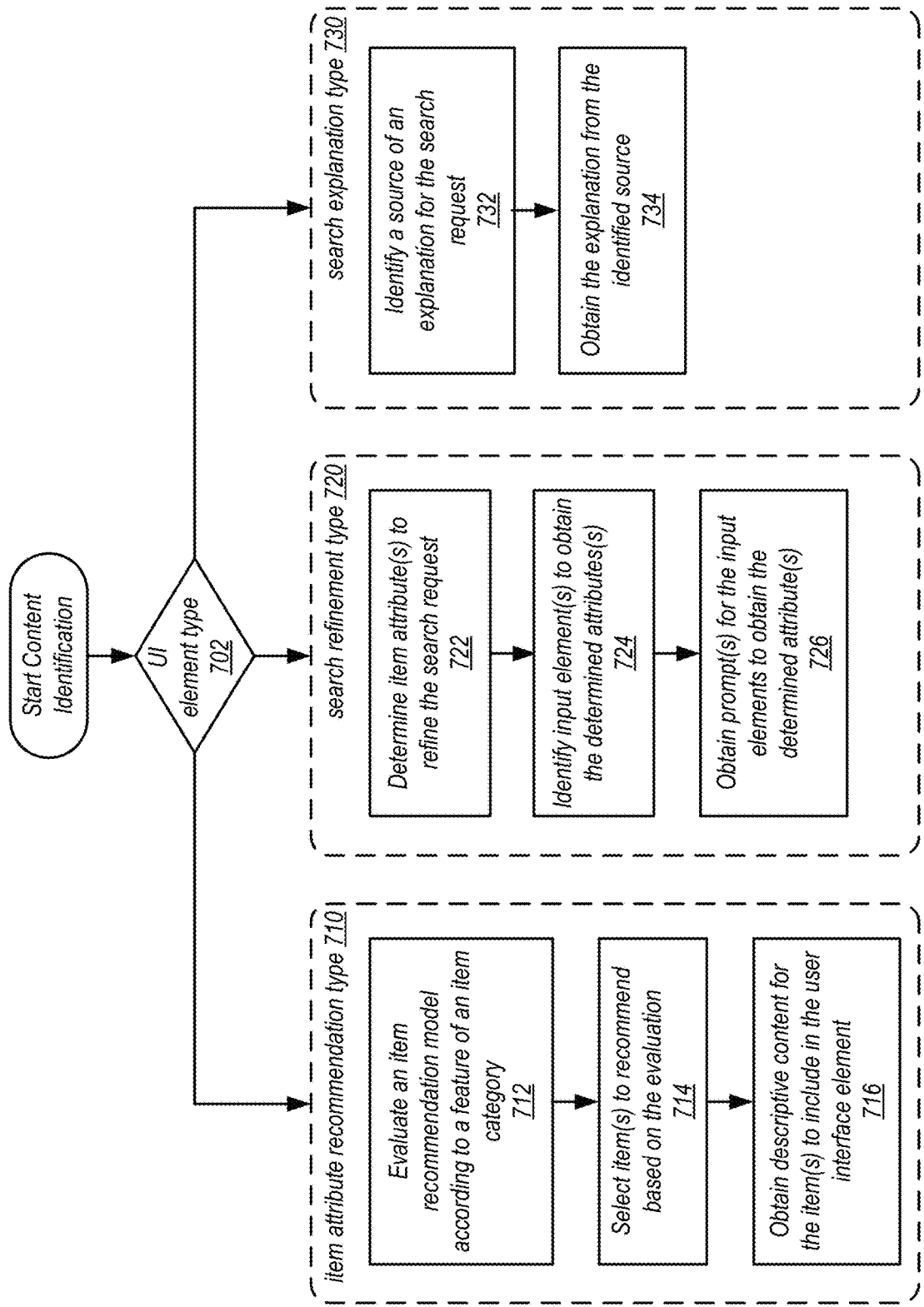
FIG. 7 is high-level flowchart illustrating methods and techniques for identifying content for user interface element types, according to some embodiments.

As noted above content identification techniques may depend on the type of UI element that is selected for inclusion with a search result. FIG. 7 is high-level flowchart illustrating methods and techniques for identifying content for user interface element types, according to some embodiments. Different user interface element types 702 may be directed to different content identification techniques. For an item feature recommendation type 710 may correspond to a feature of the item category (e.g., a physical attribute of the item, a usage, an enterprise label, standard or recommendation, price, previous purchase, release date, ratings or reviews, recommendation source), for example, an evaluation of an item recommendation model may be performed according to an identified item feature for the search request, in some embodiments. For example, a recommendation request that specifies the identified item feature may generated and sent to an item recommendation engine (e.g., for a network-based enterprise). Multiple candidate item(s) may be returned in response to the recommendation request. As indicated at 714, one or more item(s) may be selected to recommend based on the evaluation. For example, a highest ranked or recommended item may be selected according to the ranking specified in the evaluation. In some embodiments, the number of items that are recommended may be included in the selection of the item feature recommendation type (e.g., 1, 2, etc.). In some embodiments, a confidence value, ranking, or other threshold for selection may be provided (which could result in no content being identified for the user interface element if no item recommendation satisfies the specified confidence value, ranking, or other threshold for selection). For selected items, descriptive content for the item(s) may be obtained to include in the user interface element, as indicated at 716. For example, listing information or other descriptive material may be accessed to retrieve content for inclusion in the user interface element.

Figure 8:
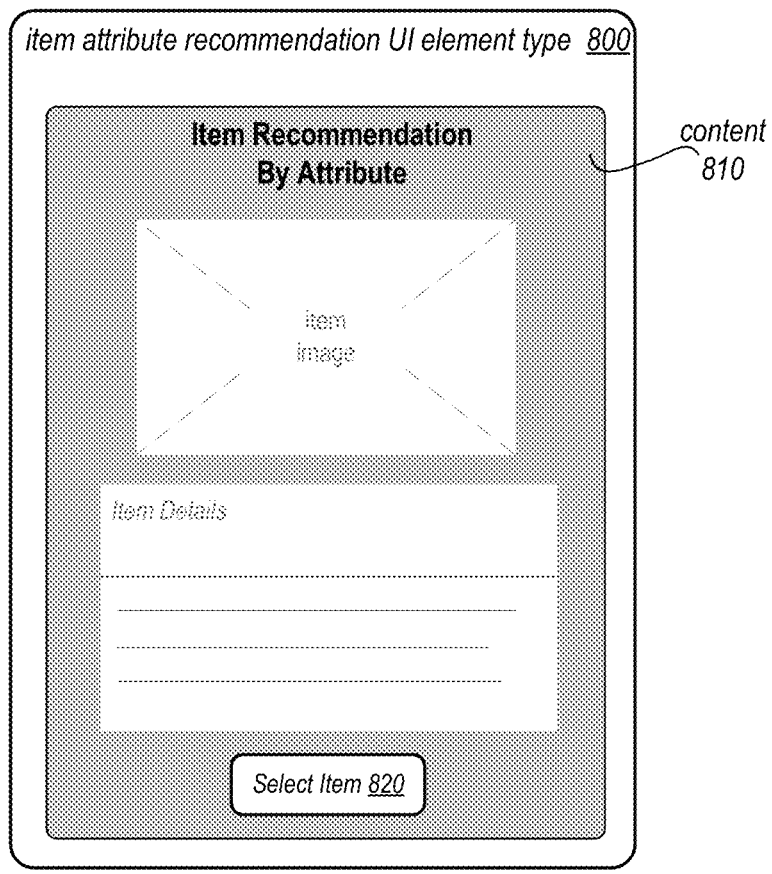
FIG. 8 is an example item feature recommendation user interface element type, according to some embodiments.

FIG. 8 is an example item feature recommendation user interface element type, according to some embodiments. Item feature recommendation user interface element type 800, may include identified content 810, such as an identified image for the recommended item, item details or other descriptive information, a user interface element to select the item 820, and the feature of the item recommendation (e.g., available for pickup within a time frame, largest storage capacity, latest model, best seller, etc.). In one example, item features may indicate user-specific item feature information, such as indicating that the item was previously bought by a user and can be delivered within a timeframe (e.g., "Buy it again by tomorrow).

For search refinement types 720, an item feature(s) to refine the search request may be determined, in some embodiments. For example, feature selection techniques for an item may be performed (e.g., by accessing a feature list for the item category), to determine which item feature(s) may further refine a search result. As indicated at 724, input element(s) to obtain the determined feature(s) may be identified, in some embodiments. For example, the determined features may be classified for text prompts or visual prompts based on the type of features determined (e.g., features that may be specified via text or features that may be visually described, such as color, shape, or other visual features of an item). As indicated at 726, prompt(s) for the input elements may be obtained to determine the feature(s), in some embodiments.

Figure 9A:
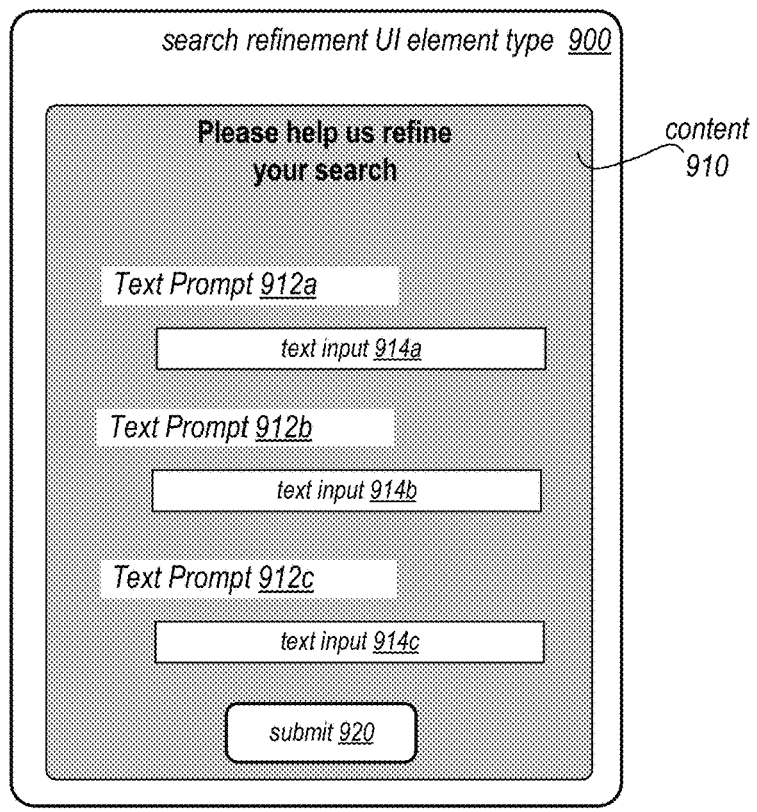
FIGS. 9A and 9B are example search refinement user interface element types, according to some embodiments.
Figure 9B:
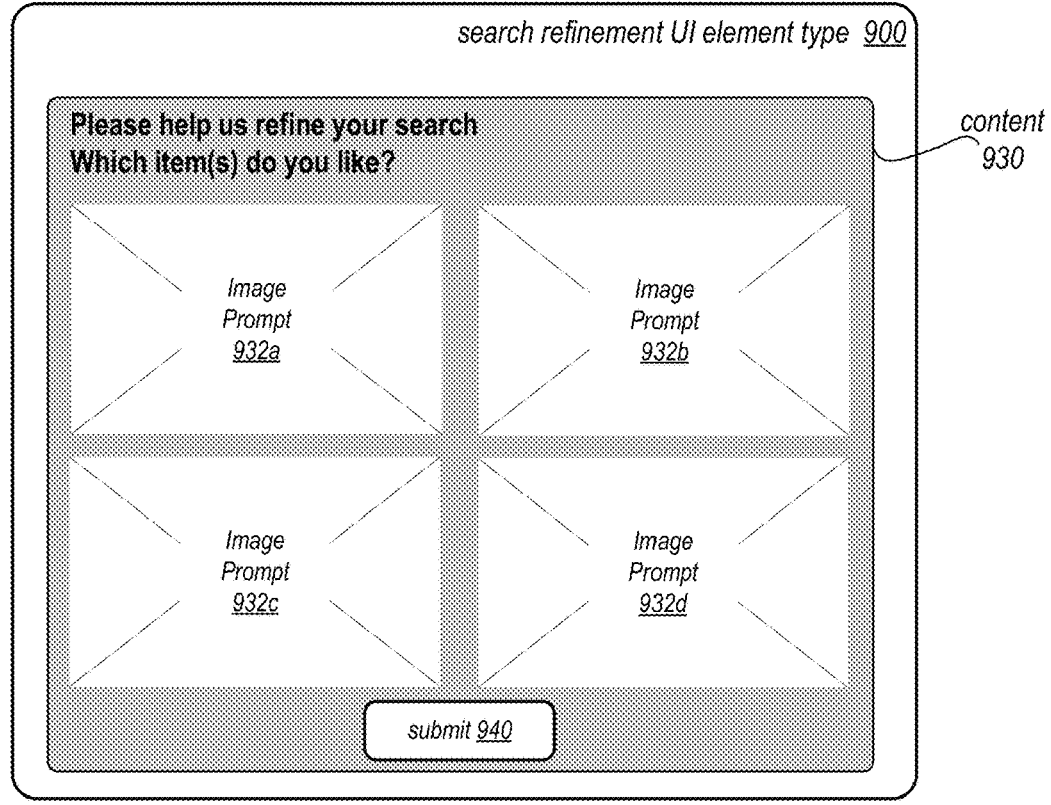

For example, as illustrated in FIG. 9A, search refinement UI element type 900 may include content 910 that identifies one or multiple text prompts, 912a, 912b, 912c, an text input elements 914a, 914b, and 914c, which may be combined to construct a questionnaire or otherwise elicit responses from a user to obtain features to further refine a search request upon submission (e.g., selecting submit element 920). Consider a search request for "binoculars." Further text prompts may prompt questions such as "What will you be observing?" which may indicate different types of binoculars for bird watching, sporting events, opera glasses, etc. FIG. 9B illustrates a search refinement UI element type 900 with content 930 that includes image prompts, 932a, 932b, 932c, and 932d. For item requests that may include a large number of results but little textual variation in describing the results, image prompts may provide further context or refinement of search results. A search request for a mobile phone case that fits a particular model of mobile phone may return a large number of results, for example. Visual prompts of different styles (e.g., graphic or colorful designs, hard or natural materials, single color or ruggedized styles) may be included in different image prompts allowing a user to select and submit (e.g., via submit element 940) further visual information to refine the search results. In some embodiments, further image prompts or text prompts may presented depending on the results that may be achieved by submitting the first set of information. For search explanation type 730, a source of explanation for the search request may be determined, in some embodiments. If the search explanation type is a video review or item demonstration, then item information may be searched or user submitted reviews or media may be searched to locate and display the determined video review. As indicated at 734, the explanation may be obtained from the identified source, in some embodiments. For example, if the search explanation is a manufacturer frequently asked questions (FAQ) that compares and contrasts different items related to the search request, then the FAQ may be retrieved by providing a link to or display of the FAQ from the manufacturer's website. Search explanation type 730 may also obtain search explanation features that provide information such as work-catalogs for other items from a similar source (e.g., a discography for a musician, a bibliography for an author, a book series listing for other books in a same series as the item), in some embodiments. In addition to the illustrated item types, various other user interface element types may be selected and modeled according to the techniques discussed above, such as sponsored user interface elements, advertisements, stores within a store branding for an item category, among others.

Figure 10:
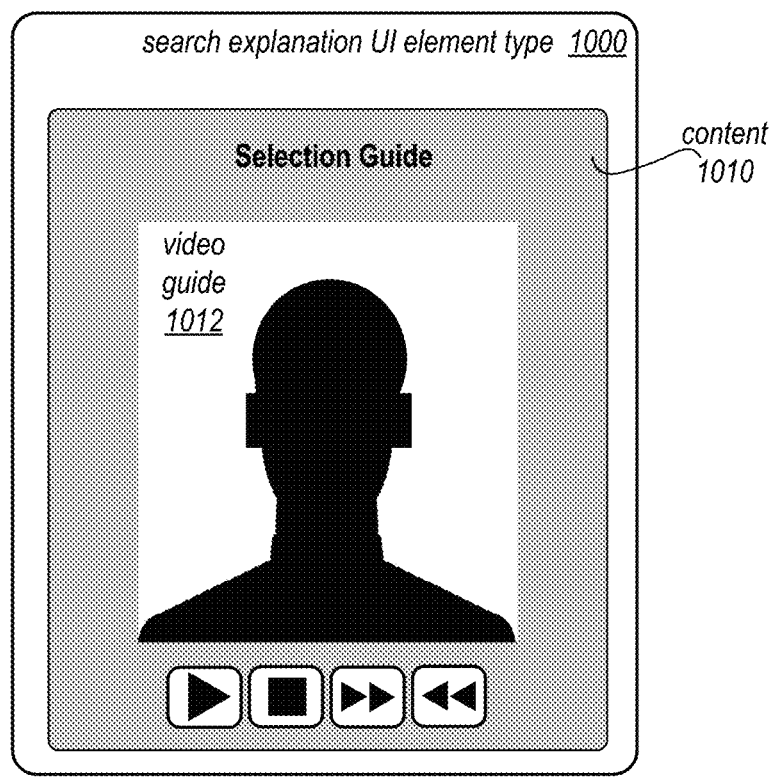
FIG. 10 is an example search explanation user interface element type, according to some embodiments.

FIG. 10 is an example search explanation user interface element type, according to some embodiments. Search explanation UI element type 1000 may be included content 1010 offers a selection guide. A video guide 1012 may be retrieved and may be played by a user selecting one or more video display controls. Other types of search explanation content may be textual and thus the previous example is not intended to be limiting. For example, a product guide may reproduce in part or in total (e.g., with the product guide author/publishers permission) as part of a search explanation type element 730.

The methods described herein may in various embodiments be implemented by any combination of hardware and software. For example, in one embodiment, the methods may be implemented by a computer system (e.g., a computer system as in FIG. 11) that includes one or more processors executing program instructions stored on a computer-readable storage medium coupled to the processors. The program instructions may be configured to implement the functionality described herein (e.g., the functionality of recommendation engines, model generation components, data stores and/or other components that implement the network-based enterprises, systems, or services described herein). The various methods as illustrated in the figures and described herein represent example embodiments of methods. The order of any method may be changed, and various elements may be added, reordered, combined, omitted, modified, etc.

Figure 11:
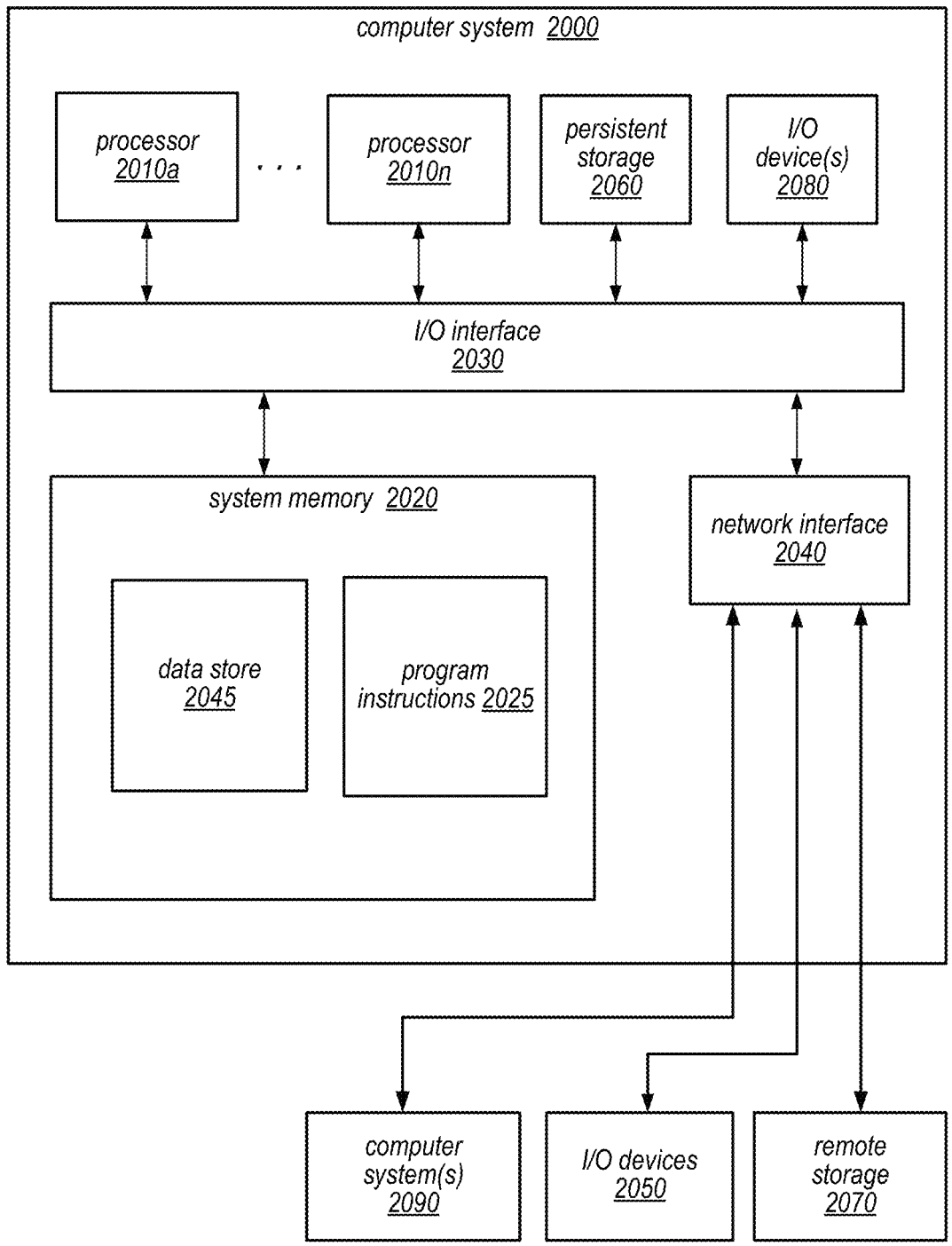
FIG. 11 is an example computer system, according to various embodiments.

Embodiments of selecting user interface element types for display with a search result according to item category features of prior item selections as described herein may be executed on one or more computer systems, which may interact with various other devices. One such computer system is illustrated by FIG. 11. Computer system 2000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 2000 includes one or more processors 2010 (any of which may include multiple cores, which may be single or multi-threaded) coupled to a system memory 2020 via an input/output (I/O) interface 2030. Computer system 2000 further includes a network interface 2040 coupled to I/O interface 2030. In various embodiments, computer system 2000 may be a uniprocessor system including one processor 2010, or a multiprocessor system including several processors 2010 (e.g., two, four, eight, or another suitable number). Processors 2010 may be any suitable processors capable of executing instructions. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA. The computer system 2000 also includes one or more network communication devices (e.g., network interface 2040) for communicating with other systems and/or components over a communications network (e.g. Internet, LAN, etc.). For example, a client application executing on system 2000 may use network interface 2040 to communicate with a server application executing on a single server or on a cluster of servers that implement one or more of the components of the database systems described herein. In another example, an instance of a server application executing on computer system 2000 may use network interface 2040 to communicate with other instances of the server application (or another server application) that may be implemented on other computer systems (e.g., computer systems 2090).

In the illustrated embodiment, computer system 2000 also includes one or more persistent storage devices 2060 and/or one or more I/O devices 2080. In various embodiments, persistent storage devices 2060 may correspond to disk drives, tape drives, solid state memory, other mass storage devices, or any other persistent storage device. Computer system 2000 (or a distributed application or operating system operating thereon) may store instructions and/or data in persistent storage devices 2060, as desired, and may retrieve the stored instruction and/or data as needed. For example, in some embodiments, computer system 2000 may host a storage system server node, and persistent storage 2060 may include the SSDs attached to that server node.

Computer system 2000 includes one or more system memories 2020 that are configured to store instructions and data accessible by processor(s) 2010. In various embodiments, system memories 2020 may be implemented using any suitable memory technology, (e.g., one or more of cache, static random access memory (SRAM), DRAM, RDRAM, EDO RAM, DDR 20 RAM, synchronous dynamic RAM (SDRAM), Rambus RAM, EEPROM, non-volatile/Flash-type memory, or any other type of memory). System memory 2020 may contain program instructions 2025 that are executable by processor(s) 2010 to implement the methods and techniques described herein. In various embodiments, program instructions 2025 may be encoded in platform native binary, any interpreted language such as Java™ byte-code, or in any other language such as C/C++, Java™, etc., or in any combination thereof. For example, in the illustrated embodiment, program instructions 2025 include program instructions executable to implement the functionality of a real-time item recommendation engine (or module or component thereof), one or more computing systems, servers or nodes implementing a network-based enterprise, or storage systems that store the item selection data and/or the item recommendation model, in different embodiments. In some embodiments, program instructions 1025 may implement multiple separate clients, server nodes, and/or other components.

In some embodiments, program instructions 2025 may include instructions executable to implement an operating system (not shown), which may be any of various operating systems, such as UNIX, LINUX, Solaris™, MacOS™, Windows™, etc. Any or all of program instructions 2025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 2000 via I/O interface 2030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 2000 as system memory 2020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 2040.

In some embodiments, system memory 2020 may include data store 2045, which may be configured as described herein. For example, the information described herein as being stored by persistent storage, such as the item selection data or the item recommendation model described herein may be stored in data store 2045 or in another portion of system memory 2020 on one or more nodes, in persistent storage 2060, and/or on one or more remote storage devices 2070, at different times and in various embodiments. In general, system memory 2020 (e.g., data store 2045 within system memory 2020), persistent storage 2060, and/or remote storage 2070 may store data blocks, replicas of data blocks, metadata associated with data blocks and/or their state, data storage configuration information, and/or any other information usable in implementing the methods and techniques described herein.

In one embodiment, I/O interface 2030 may be configured to coordinate I/O traffic between processor 2010, system memory 2020 and any peripheral devices in the system, including through network interface 2040 or other peripheral interfaces. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. Also, in some embodiments, some or all of the functionality of I/O interface 2030, such as an interface to system memory 2020, may be incorporated directly into processor 2010.

Network interface 2040 may be configured to allow data to be exchanged between computer system 2000 and other devices attached to a network, such as other computer systems 2090 (which may implement one or more storage system server nodes, enterprise system nodes, and/or clients of the network-based enterprise systems described herein), for example. In addition, network interface 2040 may be configured to allow communication between computer system 2000 and various I/O devices 2050 and/or remote storage 2070. Input/output devices 2050 may, in some embodiments, include one or more display terminals, keyboards, keypads, touchpads, scanning devices, voice or optical recognition devices, or any other devices suitable for entering or retrieving data by one or more computer systems 2000. Multiple input/output devices 2050 may be present in computer system 2000 or may be distributed on various nodes of a distributed system that includes computer system 2000. In some embodiments, similar input/output devices may be separate from computer system 2000 and may interact with one or more nodes of a distributed system that includes computer system 2000 through a wired or wireless connection, such as over network interface 2040. Network interface 2040 may commonly support one or more wireless networking protocols (e.g., Wi-Fi/IEEE 802.11, or another wireless networking standard). However, in various embodiments, network interface 2040 may support communication via any suitable wired or wireless general data networks, such as other types of Ethernet networks, for example. Additionally, network interface 2040 may support communication via telecommunications/telephony networks such as analog voice networks or digital fiber communications networks, via storage area networks such as Fibre Channel SANs, or via any other suitable type of network and/or protocol. In various embodiments, computer system 2000 may include more, fewer, or different components than those illustrated in FIG. 11 (e.g., displays, video cards, audio cards, peripheral devices, other network interfaces such as an ATM interface, an Ethernet interface, a Frame Relay interface, etc.)

It is noted that any of the system embodiments described herein, or any of their components, may be implemented as one or more network-based services, which may or may not be distributed. For example, a real-time item recommendation may be implemented by a network-based enterprise that employs the systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations. though In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:
    at least one processor; and
    a memory, storing program instructions that when executed by the at least one processor cause the at least one processor to implement an adaptive interface for a network-based enterprise that offers a plurality of items in different respective item categories at the network-based enterprise for selection via the adaptive interface;
    the adaptive interface, configured to:
        receive a search request for an item, the search request comprising an input string identifying the item;
        identify one of the respective item categories for the item according to the input string of the search request identifying the item;
        identify a display device to display a search result of the search request, the display device comprising one or more limitations on the display of the search result;
        generate an adapted display of the search result for the search request to display based at least in part on the one or more limitations of the identified display device, the adapted display comprising user interface elements generated according to an evaluation of a user interface element type selection model for the identified item category, wherein the generated user interface elements correspond to respective ones of a plurality of features of the identified item category, wherein the user interface element type selection model is one of a plurality of different user interface element type selection models respectively generated for the different respective item categories and comprising one or more types of user interface elements based on respective item category features identified according to previously selected items within the different respective item categories received via the adaptive interface;
        obtain respective content to display within the respective user interface elements that are generated according to the evaluation of the user interface element type selection model for the identified item category; and
        provide the adapted display of the search result including the generated user interface elements and the obtained content for display via the identified display device.

2. The system of claim 1, wherein the selected different user interface element types include at least one of:
    an item feature recommendation type;
    a search refinement type; or
    a search explanation type.

3. The system of claim 1,
    wherein to evaluate the user interface element type selection model for the identified item category to select the one or more types of user interface elements, the adaptive interface is configured to:
        determine that previous selections of one or more items by the user are available for evaluation; and
        include the previous selection of one or more items by the user as part of the evaluation to select the one or more types user interface elements.

4. The system of claim 1, wherein to evaluate the user interface element type selection model for the identified item category to select the one or more types of user interface elements, the adaptive interface is configured to determine display characteristics for the search results based, at least in part, on a device context determined for the search request.

5. A method, comprising:
    performing, by one or more computing devices:
        receiving a search request for an item via a user interface for a network-based enterprise that offers a plurality of items in different respective item categories for selection via the interface, the search request comprising an input string identifying the item;
        identifying one of the respective item categories for the item according to the input string of the search request identifying the item;
        identifying a display device to display a search result of the search request, the display device comprising one or more limitations on the display of the search result;
        accessing a user interface element type selection model for the identified item category to select one or more types of user interface elements of the user interface element type selection model to display according to the one or more limitations of the identified display device, wherein the selected one or more types of user interface elements correspond to respective ones of a plurality of features of the identified item category, wherein the user interface element selection model is one of a plurality of different user interface element type selection models respectively generated for the different respective item categories based on respective item category features identified according to previously selected items within the different respective item categories received via the user interface;
        obtaining respective content to display within respective user interface elements that are generated according to the selected one or more types of user interface elements, wherein the selected one or more types of user interface elements correspond to the respective ones of the plurality of features of the identified item category; and
        causing a display of a search result for the received search request to include the generated user interface elements and the obtained content to generate an adapted display of the search result via the identified display device.

6. The method of claim 5, wherein accessing the user interface element type selection model for the identified item category to select the one or more types of user interface elements comprises:
    determining that the previous selections of one or more items by a user associated with the search request are available for evaluation; and
    evaluating the previous selection of the one or more items by the user as part of selecting the one or more types of user interface elements corresponding to respective ones of the plurality of features of the identified item category.

7. The method of claim 5, wherein at least one of the selected user interface element types is an item feature recommendation type, and wherein determining the respective content for the user interface element of the item feature recommendation type comprises:
    evaluating an item recommendation model according to the corresponding feature of the item category for the item feature recommendation type;
    selecting a recommended item according to the evaluation of the item recommendation model; and obtaining descriptive content for the recommended item to include in the user interface element of the item feature recommendation type.

8. The method of claim 5, wherein at least one of the selected user interface element types is a search refinement type, and wherein determining the respective content for the user interface element of the search refinement type comprises:
    determining one or more item features to refine the search request;
    identifying one or more input elements to obtain the determined item features; and
    obtaining one or more prompts for the input elements.

9. The method of claim 8, wherein obtaining the one or more prompts for the input elements comprises determining respective text prompts.

10. The method of claim 5, wherein at least one of the selected user interface element types is a search explanation type, and wherein identifying the respective content for the user interface element of the search explanation type comprises:
    identifying a source of an explanation for the search request; and
    obtaining the explanation from the identified source.

11. The method of claim 10, wherein the source of an explanation is an external source with respect to a network-based enterprise that receives the search request for the item.

12. The method of claim 5, wherein the selected one or more user interface element types includes at least one user interface element type that is different from another user interface element type selected to include as part of the display of the search result.

13. The method of claim 5, wherein accessing the user interface element type selection model for the identified item category to select the user interface element types comprises determining that a search context for the search request is available, wherein the selecting the user interface element types is further based on the search context.

14. A non-transitory, computer-readable storage medium, storing program instructions that when executed by one or more computing devices cause the one or more computing devices to implement:
    receiving a search request for an item via a user interface for a network-based enterprise that offers a plurality of items in different respective item categories for selection via the interface, the search request comprising an input string identifying the item;
    identifying one of the respective item categories for the item according to the input string of the search request identifying the item;
    identifying a display device to display a search result of the search request, the display device comprising one or more limitations on the display of the search result;
    accessing a user interface element type selection model for the identified item category to select one or more types of user interface elements of the user interface element type selection model to display according to the one or more limitations of the identified display device, wherein the selected one or more types of user interface elements correspond to respective ones of a plurality of features of the identified item category, wherein the user interface element selection model is one of a plurality of different user interface element type selection models respectively generated for the different respective item categories based on respective item category features identified according to previously selected items within the different respective item categories received via the user interface;
    obtaining respective content to display within respective user interface elements that are generated according to the selected one or more types of user interface elements, wherein the selected one or more types of user interface elements correspond to the respective ones of the plurality of features of the identified item category;
    generating the respective user interface elements to include the respective content for display; and
    providing an adapted display of a search result for the received search request including the generated user interface elements for display via the identified display device.

15. The non-transitory, computer-readable storage medium of claim 14, wherein, in accessing the user interface element type selection model for the identified item category to select the one or more types of user interface elements, the program instructions cause the one or more computing devices to implement determining display characteristics for the search results based, at least in part, on a device context determined for the search request.

16. The non-transitory, computer-readable storage medium of claim 14, wherein at least one of the selected user interface element types is a search refinement type, and wherein, in obtaining the respective content for the user interface element of the search refinement type, the program instructions cause the one or more computing devices to implement:
    determining one or more item features to refine the search request;
    identifying one or more input elements to obtain the determined item features; and
    obtaining one or more prompts for the input elements.

17. The non-transitory, computer-readable storage medium of claim 16, wherein obtaining the one or more prompts for the input elements comprises determining respective image prompts.

18. The non-transitory, computer-readable storage medium of claim 14, wherein at least one of the selected user interface element types is a search explanation type, and wherein, in obtaining the respective content for the user interface element of the search explanation type, the program instructions cause the one or more computing devices to implement:
    identifying a source of an explanation for the search request; and
    obtaining the explanation from the identified source.

19. The non-transitory, computer-readable storage medium of claim 14, wherein multiple ones of the selected user interface element types are item feature recommendation types corresponding to different features of the item category and wherein the respective content for the user interface elements of the different item feature recommendation types includes different recommended items.

20. The non-transitory, computer-readable storage medium of claim 14, wherein, in accessing the user interface element selection model for the identified item category to select the user interface element types, the program instructions cause the one or more computing devices to implement:
    determining that the previous selections of one or more items by a user associated with the search request are available for evaluation; and
    evaluating the previous selection of the one or more items by the user as part of selecting the one or more types of user interface elements corresponding to respective ones of the plurality of features of the identified item category.

* * * * *